US010466992B2

(12) United States Patent
Klingbeil

(10) Patent No.: US 10,466,992 B2
(45) Date of Patent: Nov. 5, 2019

(54) IMAGE PLANNER

(71) Applicant: LAKESIDE SOFTWARE, INC., Bloomfield Hills, MI (US)

(72) Inventor: Michael A. Klingbeil, Roseville, MI (US)

(73) Assignee: Lakeside Software, Inc., Bloomfield Hills, MI (US)

( * ) Notice: Subject to any disclaimer, the term of this patent is extended or adjusted under 35 U.S.C. 154(b) by 251 days.

(21) Appl. No.: 14/840,791

(22) Filed: Aug. 31, 2015

(65) Prior Publication Data

US 2016/0162273 A1 Jun. 9, 2016

Related U.S. Application Data

(60) Provisional application No. 62/087,997, filed on Dec. 5, 2014.

(51) Int. Cl.
G06F 8/61 (2018.01)
H04L 29/08 (2006.01)

(52) U.S. Cl.
CPC .............. G06F 8/63 (2013.01); H04L 67/34 (2013.01)

(58) Field of Classification Search
CPC .. G06F 7/78; G06F 8/00–78; G06F 9/44–455; G06F 11/36
See application file for complete search history.

(56) References Cited

U.S. PATENT DOCUMENTS 5,604,906 A 2/1997 Murphy et al.
6,978,265 B2 12/2005 Schumacher
7,865,499 B2 1/2011 Schumacher
2008/0034074 A1* 2/2008 Becker ................. G06K 9/6224 709/223
2012/0124046 A1* 5/2012 Provenzano .......... G06F 3/0605 707/737

(Continued)

OTHER PUBLICATIONS

Chen et al., Constructing Overview + Detail Dendrogram-Matrix Views, 2014.*

(Continued)

Primary Examiner — S. Sough
Assistant Examiner — Timothy P Duncan
(74) Attorney, Agent, or Firm — Dykema Gossett PLLC

(57) ABSTRACT

A distributed computing system has a plurality of computers each having a respective image that is defined by a pairing of an operating system and a respective collection of associated software packages. Original data associated with the computers includes, for each computer, an operating system identification and an identification of a collection of software packages where the original data is stored as a plurality of records for each computer. An apparatus for analysis of the images and for image distribution planning includes image identification logic configured to compress the original data into a respective, single record for each computer, providing for efficient and scalable processing. The image identification logic is configured to identify the number of images associated with the computers that are distinct. The apparatus further includes image reducing logic that is configured to reduce the number of distinct images through manual and automatic retargeting and deprovisioning.

4 Claims, 7 Drawing Sheets

(56) References Cited

U.S. PATENT DOCUMENTS

| | | | | |
|---|---|---|---|---|
| 2013/0117676 | A1* | 5/2013 | De Pauw | G06F 3/00 |
| | | | | 715/738 |
| 2013/0326597 | A1* | 12/2013 | Matsushita | H04N 21/25875 |
| | | | | 726/5 |
| 2014/0128153 | A1* | 5/2014 | Driemeyer | A63F 13/00 |
| | | | | 463/25 |
| 2014/0149347 | A1* | 5/2014 | Ben-Shaul | G06F 9/4443 |
| | | | | 707/623 |
| 2014/0337591 | A1* | 11/2014 | Guo | G06F 11/1453 |
| | | | | 711/162 |
| 2015/0032699 | A1* | 1/2015 | Fujita | G06F 11/1451 |
| | | | | 707/649 |
| 2015/0039562 | A1* | 2/2015 | Xing | G06F 11/1438 |
| | | | | 707/639 |
| 2015/0081910 | A1* | 3/2015 | Assuncao | G06F 9/5055 |
| | | | | 709/226 |
| 2015/0293815 | A1* | 10/2015 | Harel | G06F 11/1446 |
| | | | | 707/649 |
| 2015/0312422 | A1* | 10/2015 | Leemet | H04L 41/082 |
| | | | | 455/406 |

OTHER PUBLICATIONS

Li et al., ConSnap Taking Continuous Snapshots for Running State Protection of Virtual Machines, 2009.*
Stack Overflow, Writing an image bitmask, 2013 (Year: 2013).*
Wikipedia, "Jaccard Index", http://en.wikipedia.org/wiki/Jaccard_index, Internet Archive (Year: 2013).*

* cited by examiner

| WGUID | 7-Zip 8.5 | MS Office 10 | Adobe Reader 11.0 | Visual Studio 10.0 | |
|---|---|---|---|---|---|
| 4F9B8920-F056-4842-B80F-02F5FCD845B0 | 0 | 1 | 1 | 1 | ... |
| C92E09C4-7524-437B-A1D7-0BC6E2F2ADC3 | 1 | 1 | 0 | 0 | |
| 8B2F17E7-765E-41F8-8929-1EDF4D5CF442 | 0 | 0 | 1 | 1 | |
| 66A394A8-0058-48F9-9BBB-7D15F241CA84 | 1 | 1 | 1 | 1 | |

IMAGE PLANNER

CROSS-REFERENCE TO RELATED APPLICATIONS

This application claims the benefit of U.S. provisional application No. 62/087,997, filed 5 Dec. 2014 (the '997 application), which is hereby incorporated by reference as though fully set forth herein.

BACKGROUND a. Technical Field

The instant disclosure relates generally to an information processing system and more particularly to an image planner.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

There are a number of methods commonly used to distribute software. One method of distributing software is through the use of so-called images. An image is the combination of an operating system and zero or more software packages which is distributed as a single unit. A software package is a collection of all files and configuration information needed to install an application on a computer system. A computer system can either be physical or virtual. Organizations and business entities that utilize hundreds, thousands or tens of thousands of computer systems can benefit from an economy of scale by standardizing the software that is initially distributed on such systems. Operating systems are generally paired with a plurality of frequently used software packages (e.g., Microsoft Office, WinZip, Adobe Acrobat, etc.) and preloaded onto computer systems. A pairing of an operating system with a plurality of frequently used software packages is commonly referred to as an "image". Different computer systems have different needs, but in order to take advantage of the economy of scale an organization or business entity can benefit by reducing the number of distinct images it distributes to a small manageable number in a way fulfills the needs of a large number of computer systems.

There is therefore a need for systems and methods to reduce the number of distinct images to be distributed, which can be used for image distribution planning.

The foregoing discussion is intended only to illustrate the present field and should not be taken as a disavowal of claim scope.

SUMMARY

In an embodiment, an apparatus is provided for reducing the number of distinct images. The apparatus is suitable for use in a distributed computing system having a plurality of computers wherein each computer has a respective image associated therewith defined by a pairing of a respective operating system and a respective collection of zero or more associated software packages. The apparatus includes an electronic processor and a memory coupled to the processor. The apparatus further includes image identification logic stored in the memory which, when executed by the electronic processor, is configured to identify the number of distinct images from the plurality of images associated with the computers. The apparatus further includes image reducing logic stored in the memory which, when executed by the processor, is configured to reduce the number of such distinct images, which as mentioned can be advantageous from an image distribution standpoint.

In an embodiment, an electronic data collection agent in communication with the computers is configured to collect original data relating to the computers. The original data includes, for each computer, an identification of an operating system and a respective collection of associated software packages wherein the original data is stored as a plurality of records for each computer. The image identification logic is further configured to compress the original data into a respective, single record for each computer. Such single record per computer improves efficiency as well as improves the scalability of the apparatus.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Before proceeding to a detailed description of an apparatus 10 for computer image analysis and planning, an overview description of such an apparatus will first be described. In various embodiments, a list of all computing machines (hereinafter "computers") under analysis and the software packages that are installed on each given computer is obtained (hereinafter "original data"). In an embodiment, the original data is re-fashioned such that the data for each computer is represented as a single record. Methods are used which efficiently group the re-fashioned original data into distinct images. A user, through a user interface, can direct changes to the associations between the computers and their associated software packages. A goal in making these changes in associations is to reduce the resulting cardinality of distinct images to a relatively small, manageable number. The apparatus is configured to provide continuously updated feedback as associative changes are proposed by the user, via the user interface, in an iterative fashion, until such time as the resulting cardinality of distinct images has been reduced to the desired number.

Figure 1:
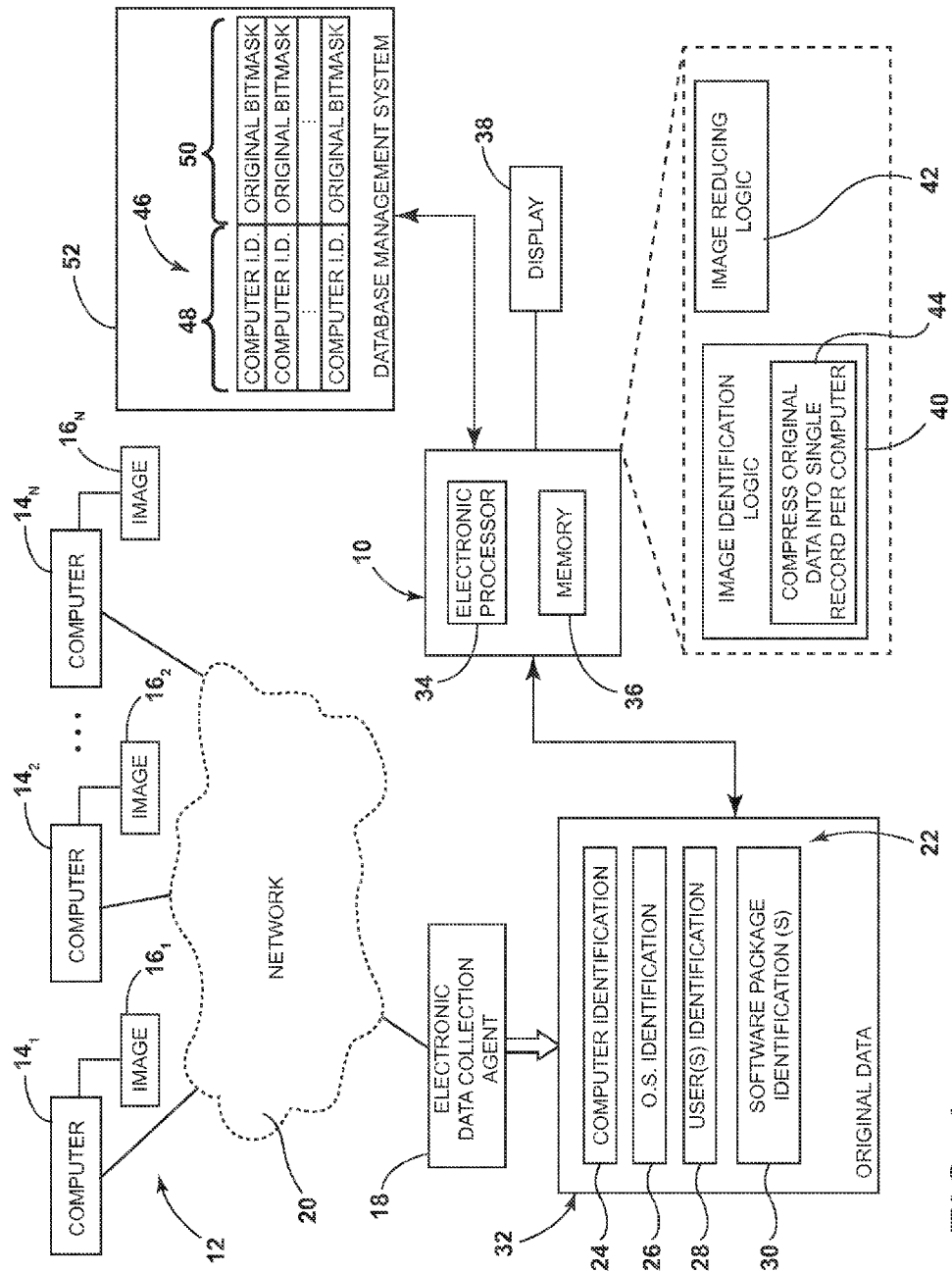
FIG. 1 is simplified diagrammatic and block diagram of an apparatus for computer image analysis and planning suitable for use in a distributed computing system.

Referring now to the drawings wherein like reference numerals are used to identify identical or similar components in the various views, FIG. 1 is a diagrammatic view of an apparatus 10 for computer image analysis and planning for use in an exemplary environment. For example only, FIG. 1 shows a distributed computing system 12 having a plurality of computers $14_1$, $14_2$, . . . , $14_n$ wherein each computer $14_1$, $14_2$, . . . , $14_n$ has a respective computer image $16_1$, $16_2$, . . . , $16_n$ associated therewith. It should be understood that the computers $14_1$, $14_2$, . . . , $14_n$ may be either physical computers or virtual. Additionally, without loss of generality, computers $14_1$, $14_2$, . . . , $14_n$ may comprise any conventional computing apparatus, for example only, a Windows-based computer, or may be based on other widely available operating systems, such as, but not limited to, Unix-based systems, Linux-based systems, and Apple Mac OS X based systems.

As set forth above, each image $16_1$, $16_2$, . . . , $16_n$ may be described as a pairing of an operating system (for the computer) and a respective collection of software packages. A software package may comprise a collection of all files and configuration information needed to install the application program on the computer. The software package may also have an edition or version number associated therewith.

FIG. 1 also shows an electronic data collection agent 18 coupled to the plurality of computers $14_1$, $14_2$, . . . , $14_n$ by way of a communication network 20. The electronic data collection agent 18 may be configured to collect and store original data 22 in regard to the plurality of computers $14_1$, $14_2$, . . . , $14_n$. Various systems are known in the art for monitoring, collecting, processing, and storing original data, as seen by reference to U.S. Pat. No. 6,978,265, filed 15 Jan. 2002 (the '265 patent, entitled "SYSTEM AND METHOD FOR MANAGING INFORMATION FOR A PLURALITY OF COMPUTER SYSTEMS IN A DISTRIBUTED NETWORK") and U.S. Pat. No. 7,865,499, filed 7 Nov. 2005 (the '499 patent, entitled "SYSTEM AND METHOD FOR MANAGING INFORMATION FOR A PLURALITY OF COMPUTER SYSTEMS IN A DISTRIBUTED NETWORK"). The '265 patent and the '499 patent are both hereby incorporated by reference as though fully set forth herein.

The original data 22 may comprise various items of information related to computers $14_1$, $14_2$, . . . , $14_n$, including but not limited to a computer identification 24, an operating system identification 26, a user(s) identification 28, and a listing of the collection of software packages 30. Although not shown in FIG. 1, the original data 22 may comprise still further information, including usage information concerning the individual software packages in the collection of software packages. Original data 22 may be stored in a conventional data storage facility 32, for example, which may be of a local desktop database type, or may be a client server type database (e.g., a Microsoft SQL Server, an Oracle database, or the like). In an alternate embodiment, the database may comprise any mechanism or structure for storing or maintaining information, such as a flat file, or in any other type of memory (e.g., RAM, ROM). In an embodiment, however, the original data 22 is stored in a database management system, such as a SQL database 32.

With continued reference to FIG. 1, the apparatus 10 may include one or more electronic processors 34 (only one shown), a memory 36, a variety of input/output mechanisms such as a display 38, and a variety of other I/O mechanisms that for clarity have not been illustrated, such as a mouse or other user pointing/selection device, a microphone, a speaker, and/or communication interfaces, such as wired or wireless communication interfaces.

Processor 34 is configured generally to control the overall operation of the apparatus 10, including coordination and cooperation among and between the other components apparatus 10. For example, overall control may be achieved through execution by the one or more processors 34 of a suitable operating system (not shown; e.g., Microsoft WINDOWS, Apple Mac OS X, etc.). Processor 34 may include a central processing unit (CPU), memory (in addition to or such as the illustrated memory 36) and an input/output (I/O) interface through which processor 34 may receive a plurality of input signals as well as generate a plurality of output signals. Memory 36 is provided for storage of data and instructions or code (i.e., software) for processor 34. Memory 36 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Display 38 functions as an input/output device for the user of apparatus 10 and may include components known in the art. For example, aspects of a user interface (see e.g., FIG. 5) may be shown on display 38 for interaction with and by the user.

Overview.

As described above, in any organization or business enterprise that utilizes computers there exists a mapping of each computer to a combination of an operating system and zero or more software packages that are installed on the computer. However, the number of associations to be assessed complicates the image analysis and planning, resulting in challenges from at least a scalability point of view. The configuration of each computer therefore potentially generates one or more data items where each particular data item can represent either the mapping of that particular computer to a single operating system or the mapping of that particular computer to a single software package. In this format, one or more separate data items may represent a single computer. Consequently, as the number of computers under assessment increases, the number of comparisons that need to be performed in order to conduct the image analysis and planning can grow exponentially. An implementation for image analysis and planning that processes information in such a multi-item format (per computer) will not scale efficiently as the number of computers increases.

In light of the challenges noted above, an alternative is to represent the above-described mappings in a compressed form by organizing the plural data items into a matrix. For example, for purposes of grouping into images, the above-mentioned association between an operating system and a computer can be thought of and treated as simply just another mapping between a computer and a software package. In general, let each row of the matrix correspond to exactly one computer. Also, let each column of the matrix correspond to exactly one software package. Further, let the value present at the intersection of a given row and column: (i) be set to a one (i.e., logic 1) to indicate that a given software package is associated with and present on the given computer or (ii) be set to a zero (i.e., logic 0) to indicate that a given package is not associated with and is absent on the given computer. Furthermore, if each row of this matrix is treated as a single data item, the data can be manipulated in a scalable and efficient fashion for purposes of image analysis and image distribution planning. In an embodiment, all computers of a given model may be assumed to use the same operating system, and thus no specific additional designation of this need be made in the association matrix. In a further embodiment, a specific column can be added to the association matrix to represent the particular operating system associated with the computer (i.e., treat the operating system just like another software package—another column).

With continued reference to FIG. 1, and with the foregoing context in mind, the apparatus 10 includes image identification logic 40 and image reducing logic 42.

The image identification logic 40 is stored in memory 36 which, when executed by the electronic processor 34, is configured to identify the number distinct images in the plurality of images $16_1, 16_2, \ldots, 16_n$ associated with the computers $14_1, 14_2, \ldots, 14_n$. As noted above, the meaning of an image is ordinarily the combination of an operating system and zero or more software packages that can be distributed as a single unit. Distinct retains its plain and ordinary meaning (i.e., different from each other). In particular, in an embodiment, image identification logic 40 is further configured, through consolidation logic 44, to compress the original data 22—specifically those parts relating to the identification of the operating system and the identification of the software packages—into a respective, single record associated with each of the plurality of computers $14_1, 14_2, \ldots, 14_n$.

The image reducing logic 42 is stored in memory 36 which, when executed by the electronic processor 34, is configured to reduce the number of distinct images, as described in greater detail below.

With continued reference to FIG. 1, and in an embodiment, the image identification logic 40 of apparatus 10 is configured to build an association matrix 46 containing a single row for each one of the computers $14_1, 14_2, \ldots, 14_n$. Each row or data item is partitioned into a first part, namely a computer identifier 48 and a second part, namely, a collection 50 of associative bits. The associative bits (collectively, item 50) are the values present at the intersection of each column with a particular row excluding one column that contains the computer identifier 48. In an embodiment, the associative bits of any particular row are treated as one unit rather than a collection of individual columns. In other words, the associative bits of each row are treated as a single array of bits. This is sometimes referred to as a horizontal bit vector. Thus, in an embodiment, the image identification logic 40 is configured to (i) construct, for each of the computers $14_1, 14_2, \ldots, 14_n$, a respective binary word wherein each bit position of the binary word corresponds to the presence or absence of one of the software packages and (ii) build an association matrix 46 by associating, for each of the computers $14_1, 14_2, \ldots, 14_n$, a respective computer identification 48 with a respective one of the constructed binary words 50.

The association matrix 46 may be stored in any conventional data storage facility; however, for reasons that will become apparent below, in an embodiment, the association matrix 46 may be stored in a database management system, such as a SQL database 52. In an embodiment where the data collection agent 18 and the apparatus 10 are co-deployed, the database system 32 and the database system 52 may be the same database system.

Figure 2:
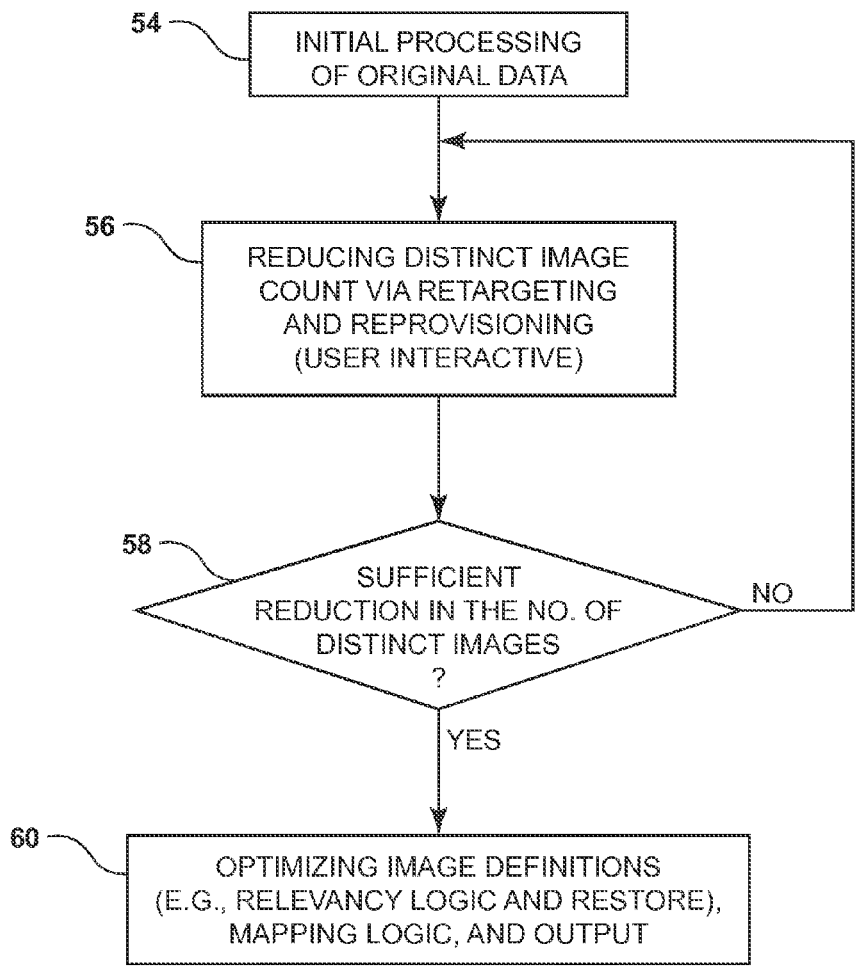
FIG. 2 is a flowchart diagram of an overview method of operation of the apparatus of FIG. 1.

FIG. 2 is a flowchart of an exemplary method of the overall operation of apparatus 10. As set forth above, one goal of apparatus 10 is to reduce the number of images to be distributed to some manageable, desired and/or necessary number, for at least purposes of distribution of the images. The method begins in step 54.

In step 54, the image identification logic 40, including consolidation logic 44, performs initial processing of the original data 22, as set forth generally above, and as will be set forth in a specific embodiment below. The method proceeds to step 56.

In step 56, the image reducing logic 42 operates to reduce the distinct image count, for example, only, by way of retargeting and deprovisioning (described in greater detail below).

In step 58, the inquiry is whether logic 42 has reduced the number of distinct images to a manageable and/or desired and/or necessary number? Steps 56 and 58 are user interactive, and in particular, the answer in step 58 may be determined by the user, in an embodiment. In this regard, improvements in scalability allow these steps to be done in real time. The method iterates through steps 56 and 58 until the number of distinct images has been reduced to an acceptable number. The method then proceeds to step 60.

In step 60, the image definitions are optimized, as will be described in greater detail below, and the final image definitions and mappings will be output. For example, initial decisions made in steps 56, 58 to deprovision certain software packages, ostensibly to reduce image count, are checked to determine whether such deprovisioning actually reduced the image count (and if not, such software packages are "added back" as part of the image definition).

Figures 3, 4:
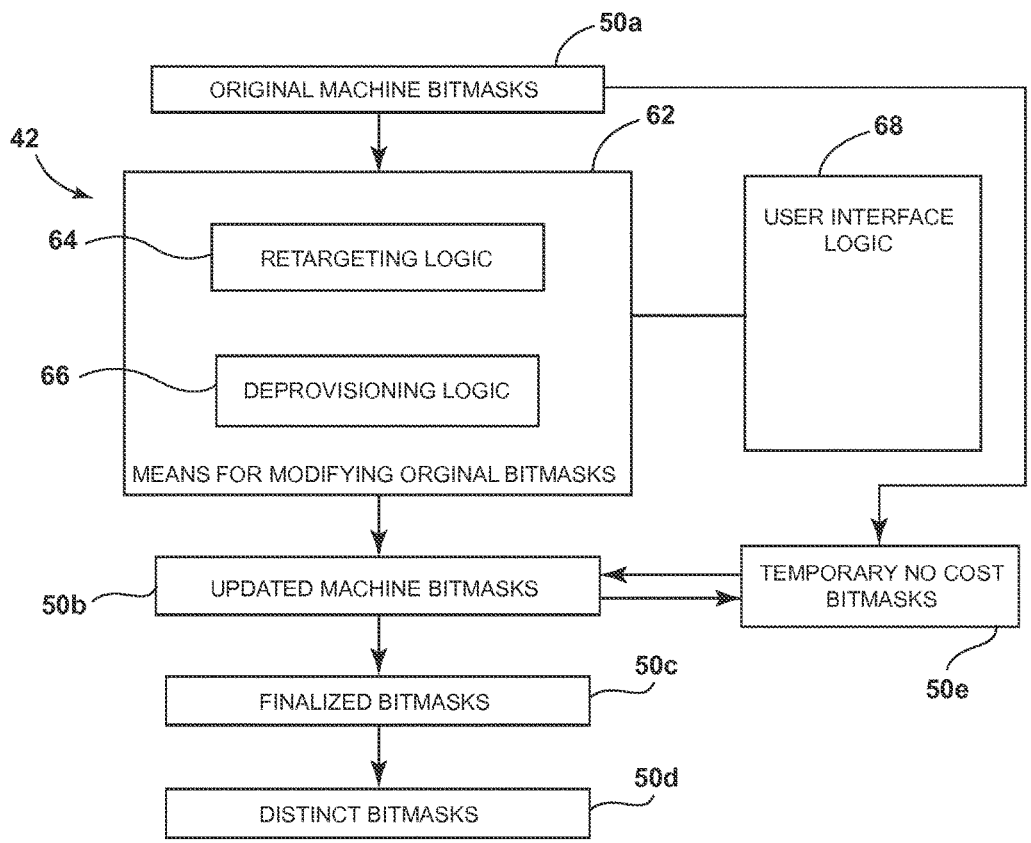
FIG. 3 is a simplified representation of an association matrix, in an embodiment.
FIG. 4 is a block diagram showing, in greater detail, the image reducing logic of FIG. 1.

FIG. 3 is an exemplary association matrix, designated 46a, having a computer identifier part designated 48a and collection of associative bits, designated an original machine bitmask 50a. As described above, one purpose of apparatus 10, as performed by image identification logic 40, is to combine computing machines or computers with the same installed software packages into groupings called images. Computers with an identical list of software packages are combined together into an image.

As noted above, each bit represents the presence or absence of a particular software package on a particular computer (i.e., a 1 means present, 0 means absent). While FIG. 3 shows each bit as being contained in a separate column, in an embodiment, the bitmasks 50a constitute a single binary word and thus the records (rows) of the matrix 46a can be sorted for grouping purposes based on the "value" of the single column (binary word).

In an embodiment, the association matrix 46a is stored in a SQL database 52 as a table, and the original machine bitmasks 50a can be represented as a single varbinary (MAX) column. In an embodiment, a varbinary(MAX) column in a SQL Server database table can potentially represent 16 million software packages. Thus, the original machine bitmask 50a can be created with one bit (i.e., conceptually a column) associated with each software package that can potentially be installed on one of the computers $14_1, 14_2, \ldots, 14_n$, in the distributed computing system 12. As to the original machine bitmask 50a, for any particular computer, a one ("1") in a bit position signifies that a given software package is installed on that particular computer and a zero signifies that a given software package is not installed on that particular computer. After the initial processing by logic 40 on the original data 22, each one of the computers $14_1, 14_2, \ldots, 14_n$, has associated therewith one and only one original machine bitmask 50a.

Determining the number ("count") of distinct images. By virtue of the listing of software packages that are present on each computer $14_1, 14_2, \ldots, 14_n$, being compressed into a single record, logic 40 is configured to determine the number of distinct images by issuing a "SELECT Distinct" statement to be performed on the association matrix 46a (i.e., database table) on the basis of the original machine bitmasks 50a. This will yield a listing of the distinct or unique images that are present in the association matrix 46a. A count of the number of items in the list can be used to determine the number of distinct images.

In an alternate embodiment, a SQL "SELECT Count (Distinct x)" statement may be performed on the association matrix 46a on the basis of the original machine bitmasks 50a. This will directly yield a count of the number of distinct or unique images that are present in the association matrix 46a. The count of distinct bitmasks in the association matrix is equivalent to the count on distinct images.

In an alternate (non-SQL database embodiment), the association matrix 46a may be sorted followed by a single sequential scan. The art is replete with efficient sorting approaches (e.g., quicksort, etc.) that could be used.

In an alternate embodiment, the association matrix 46a may be operated upon by one of many well-known algorithms (prior art) that use hashing or other techniques to efficiently determine a list of distinct items given a list of non-distinct items.

In an alternate embodiment, the association matrix 46a may be operated upon by one of many well-known algorithms (prior art) that use hashing or other techniques to efficiently determine the cardinality of a list of distinct items given a list of non-distinct items. This cardinality is equivalent to the count of distinct images.

In all above embodiments, the underlying arrangement of a single table row for each computer allows for very efficient processing, and is very efficient even on tables with a very large number of records. Embodiments according to the instant disclosure thus exhibit superior scalability.

It should be appreciated that current SQL Server implementations are not currently capable of setting or resetting (i.e., clearing) individual bits in the multi-bit bitmasks 50a, although it is capable of sorting, joining, filtering and performing a SELECT Distinct on columns of type varbinary(MAX) which do contain the bitmasks 50a as described above. Accordingly, in an embodiment, the function of setting and resetting (clearing) individual bits in bitmask 50a may be performed by logic 40 through programmed code apart from the SQL Server system, using known programming languages and approaches (e.g., only, such bit manipulation may be performed in C# code).

As mentioned above, where the data collection agent 18 is co-deployed with the apparatus 10, the same database management system can be used to store both the original data 22, as well as the association matrix 46a. This allows manipulation of the original data 22 and association matrix 46a directly through, for example, SQL statements. However, as also mentioned above, since commercially available SQL Server software cannot presently set or reset (clear) individual bits in the bitmasks 50a, such bit manipulation is performed by logic 40 outside of the SQL Server software (e.g., C# code). In such circumstances, in an embodiment, a so-called "round trip" transaction method is provided as described below.

A round trip transaction reads a stream of data from the database in which the association matrix 46a is stored into memory 36 (e.g., RAM), where it is manipulated by the image identification logic 40 and the image reducing logic 42 (e.g., C# code). The round trip transaction then sends the stream back to the database in which the matrix 46a is stored. Only a few records from a given table are therefore ever present in memory 36 at one time. In an embodiment, one record is read from the database at a time, which is then processed, and then written back to the database. Where this is not possible, the logic 40, 42 operates on small groups of records from association matrix 46a. In an embodiment, a restriction prevents the entire association matrix 46a from being brought entirely into memory. This approach limits memory usage to relatively low level and further supports scalability. In an embodiment, a SQL Server bulk copy technique may be used by logic 40, 42 to move processed data back into the database (i.e., back into the association matrix 46a).

Reducing the Number (the "Count") of Distinct Images.

In order to take advantage of the economy of scale, an entity may desire or need to reduce the number of distinct images it distributes to a reasonably small, manageable number. The apparatus 10 is configured to reduce the number of distinct images through at least two mechanisms: (i) manual or automatic retargeting, and (ii) manual or automatic deprovisioning. These mechanisms will be explained below.

FIG. 4 is simplified block diagram of image reducing logic 42 of FIG. 1, which includes means 62 for modifying the original machine bitmasks 50a and replacing the original machine bitmasks 50a in the association matrix 46a with updated machine bitmasks 50b such a number of distinct updated machine bitmasks 50b is less than the number of distinct original machine bitmasks 50a. The modifying means 62 includes retargeting logic 64 and deprovisioning logic 66, both of which may make use of a user interface generated by user interface logic 68.

Retargeting logic 64 is configured to perform the retargeting substitutions described below. Retargeting is the process of substituting one software package for a different software package. A first common example of retargeting is to substitute the latest (most recent) edition or version of a software package for older versions of the same software package. A second common example of retargeting is to substitute a first software package for one or more second, different software packages that provides the same or similar functionality. As to the second common example, retargeting may involve substituting a software package called 7-Zip for another software package called WinZip, or vice versa, both of which perform similar functions. The retargeting logic 64 is configured to provide both manual (via the user interface generated by user interface logic 68) and automatic retargeting of software packages. Moreover, the retargeting substitution described above involves modifying individual bits in the original machine bitmasks 50a. For example, in the first common example described above, replacing 3 different versions of a particular software package with a single, latest version reduces the number of images—at least with respect to the particular software package involved, from 3 to 1.

Retargeting therefore provides the opportunity for and often has the effect of reducing the distinct image count in the association matrix 46a.

The term deprovisioning as it is used herein is defined to mean a change in the association of one or more computers with a given software package. An association of a software package to a computer is defined to mean that said software package is present (i.e. installed) on said computer.

In an embodiment, deprovisioning logic 66 is configured generally to set a state of a software package to one of the following deprovisioning states, comprising (i) a first state where the software package to be deprovisioned is deemed to be installed on all computers and is thus in all images ("Install Everywhere");

(ii) a second state where the software package to be deprovisioned is deemed to be published ("Published");

(iii) a third state where the software package to be deprovisioned is deemed to be available to an end user by way of virtualization and apart from any distributed image ("Virtualize");

(iv) a fourth state where the software package to be deprovisioned is deemed to be available at no cost ("No Cost");

(v) a fifth state where the software package to be deprovisioned is deemed to be available via user installation apart from any distributed image ("User Installed"); and (vi) a sixth state where the software package to be deprovisioned is deemed not to be provisioned in any distributed image ("Do Not Provision").

The deprovisioning logic 66 may store the above correlations between a software package and a deprovisioning state in a separate data structure (not shown). As a consequence of being deprovisioned, the bit corresponding to the deprovisioned software package is set to zero in the corresponding machine bitmask 50b (i.e., the updated machine bitmask) of each computer. It should be appreciated that bits associated with a deprovisioned software package—and are thus all set to zero—are no longer a differentiating factor as between the plurality of computers $14_1, 14_2, \ldots, 14_n$ defined in the association matrix 46a. As deprovisioning logic 66 deprovisions more and more software packages, the number of distinct machine images will tend to be reduced. In an embodiment, treating certain software packages in one of the above deprovisioning states as deprovisioned even if they are marked as Install Everywhere or No Cost simplifies and speeds up the image analysis described herein. Thus, in these two deprovisioning states, namely, the Install Everywhere state and the No Cost state, additional handling (e.g., setting the bits to 1) is provided after the initial distinct image counts have been made, as will be described in greater below.

In the Install Everywhere deprovisioning state, it may appear counter intuitive to deem the involved software package as being deprovisioned. Such a software package can be deemed universally provisioned because all computers will contain this software package in its associated image. That being said, it should be understood that for purposes of differentiating computers via their associated lists of software packages (i.e., the machine bitmasks), it makes no difference if a software package is available on all computers or available on zero computers. The end result is still that the particular software package in question is no longer a differentiating factor because either all images include it or no images include it. Only software packages that are available on some computers but not on others are relevant when it comes to dividing the association matrix up into distinct images.

In an embodiment, deprovisioning logic 66, along with user interface logic 68, provides a mechanism to receive from a user an identification of one or more software packages to be deprovisioned (i.e., to be set in one of the above described deprovisioning states). This embodiment thus involves manual deprovisioning. In particular, the deprovisioning logic 66/user interface logic 68 presents the user with a list of all the available software packages. The user can opt to deprovision any software package in any one of the ways listed above (i.e., set in any one of the deprovisioning states). It should be appreciated that given some configurations contain over 20,000 unique software packages, a process of reducing the distinct image count by manual deprovisioning can be quite daunting. Accordingly, the apparatus 10 also provides, through deprovisioning logic 66, an automated process for deprovisioning software packages en masse in order to realize the desired goal of a certain, small manageable number of distinct images.

Automatic Deprovisioning.

The deprovisioning logic 66 incorporates an image reducer function (hereinafter "image reducer") that uses rules and associated user-adjustable thresholds to automatically identify and deprovision matching software packages. The image reducer works in a two-pass fashion. In the initial pass, software packages meeting certain rule criteria are deprovisioned and set or marked to one of the above-listed deprovisioning states. The apparatus 10 is configured to perform a quick count technique (described below) to determine the number of distinct images resulting from a particular implementation of the rules. The user interacts with the image reducer of the deprovisioning logic 66 in an iterative fashion until the user is satisfied with the resulting, reduced number of distinct images produced by the rules. This is shown in FIG. 4 with updated machine bitmasks 50b, which, as modified through the automatic deprovisioning, resulted in the reduced (desired) number of distinct images.

In this embodiment, when the user is satisfied with the achieved number of distinct images produced by the rules, a second, more thorough, pass is made to "un-deprovision" software packages that meet the rule criteria but which have no relevant effect on reducing the image count. The finalized machine bitmasks 50c, shown in FIG. 4, represent the result of the un-deprovision second pass. In sum, automatic deprovisioning only deprovisions software packages when doing so actually contributes to a reduction in the number of distinct images.

Figure 5:
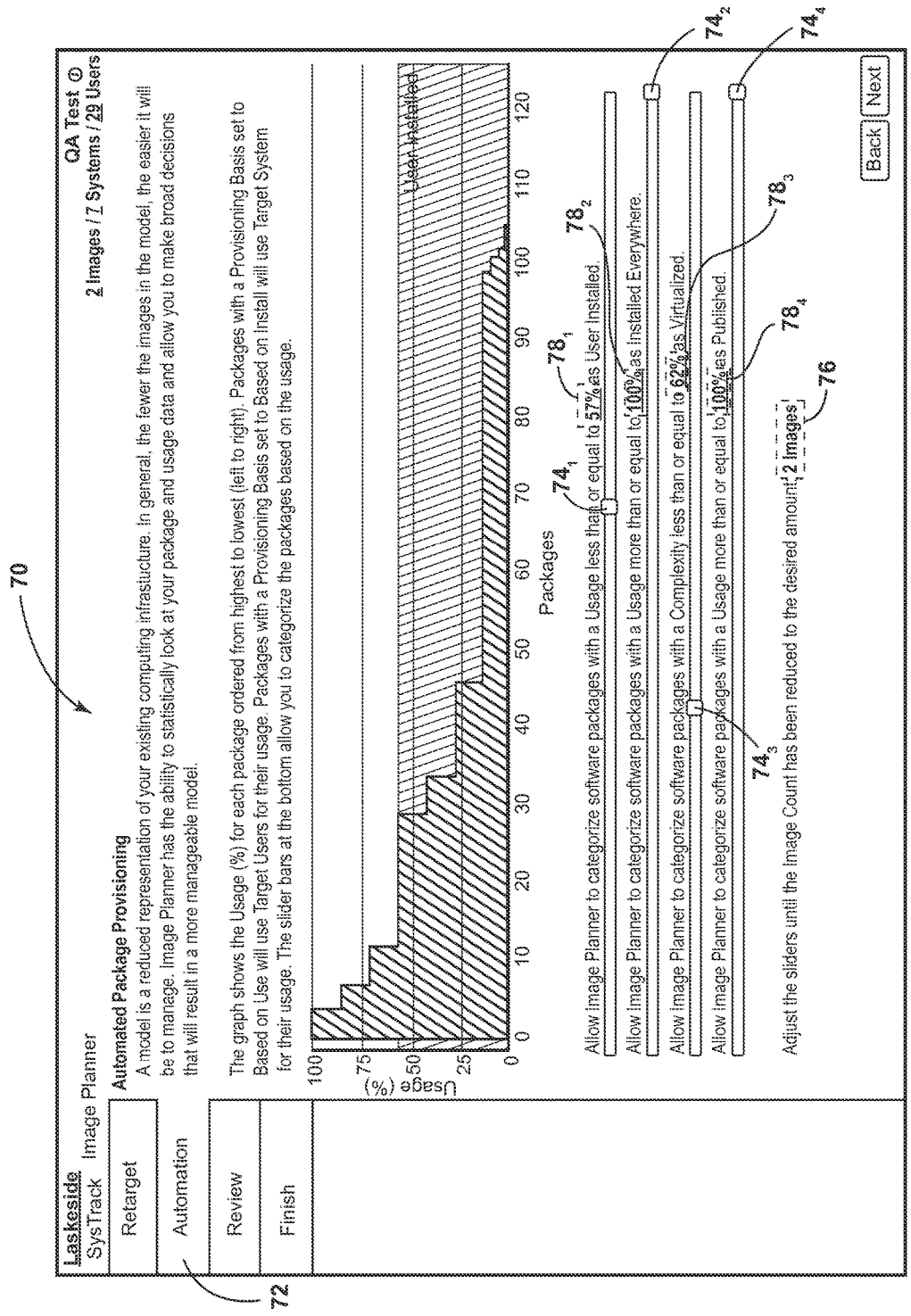
FIG. 5 is screen display generated by the user interface logic of FIG. 4, in an embodiment.

FIG. 5 is a screen display of a user interface 70 generated by user interface logic 68. In the illustrated embodiment, the user interface 70 corresponds to the automatic deprovisioning processing described above, as selected by a user of a selection tab 72 labelled "Automation". The user interface logic 68, by way of the user interface 70, is configured to receive from a user at least one user designation selected by the user. User interface 70 employs, for example only, a plurality of user-adjustable sliders $74_1, 74_2, 74_3$, and $74_4$ to adjust respective parameters that allow predetermined rules to be applied to the association matrix 46a. In the illustrated embodiment, the user can adjust the sliders $74_1, 74_2, 74_3$, and $74_4$ in order to reduce the number (count) of distinct images to a desired number, for example as shown in box 76.

The above-mentioned rules operate, in an embodiment, based on statistical characteristics of the overall collection of software packages represented in the association matrix 46a. FIG. 5 shows several rules that have user adjustable criteria. For example only, box $78_1$ shows a first usage percentage, wherein the deprovisioning logic 66 is configured to categorize software packages having a first usage less than or equal to the user-selected first usage percentage, in a User Installed deprovisioning state (fifth state above). Likewise, box $78_2$ shows a second usage percentage, wherein the deprovisioning logic 66 is configured to categorize software packages having a second usage more than or equal to the user-selected second usage percentage, in a Install Everywhere deprovisioning state (first state above). Additionally, box $78_3$ shows a complexity parameter, wherein the deprovisioning logic 66 is configured to categorize software packages with a complexity less than or equal to the user-selected complexity parameter, in a Virtualize deprovisioning state (third state above).

Complexity is a score that is assigned to a software package. The higher the score, the harder it is to publish or virtualize such software package. Attributes of a software package that increase its complexity score include the size of the software package (e.g., in bytes), whether the software package is a 16-bit or a 64-bit application, whether the software package uses one or more device drivers, whether the software package uses or relies on a service, whether the software package uses shell extensions or office add-ins, and the like. It should be understood that other factors may be identified and/or assessed in determining its complexity score.

Finally, box $78_4$ shows a third usage percentage, wherein the deprovisioning logic 66 is configured to categorize software packages with a third usage that is more than or equal to the user-selected third usage percentage, in a Published deprovisioning state (second state above).

It should be appreciated that the term usage can be taken in relation to the percentage of the number of installations of a given package to the total number of computers, or alternatively, to an actual usage (i.e., the percentage of distinct users that have used a given package at least once). The software packages can thus have a provisioning-basis selected from the group comprising based-on-install or based-on-use. Accordingly, the determination of a usage percentage (above, the first, second, and third usages) can be determined relative to the provisioning-basis of the software package (i.e., either the based-on-install basis or the based-on-use basis).

The image reducer has three rules that are based on percentage thresholds. On a package by package basis that percentage can be calculated based on the computers it is installed on or based on the number of different users that have actually used the package. For example, it might be that package xyz is installed on 85 percent of the computers in a given model but used by only 64 percent of the users contained in the model. The provisioning basis of a given software package determines which percentage will be evaluated against the rule.

In other embodiments, different rules may be used to facilitate automated image reduction. Any rule or criteria capable of selecting one or more software packages may be employed in order to perform automated image reduction.

Counting the Number of Distinct Images.

As noted above, the deprovisioning process employs a quick determination of the count of the distinct images in the association matrix 46a, as the user provides inputs to the deprovisioning logic 66. In an embodiment, a SELECT Count(Distinct x) statement (i.e., a SQL Server statement) can be executed on the association matrix 46a that contains the updated machine bitmaks 50b associated with each computer (updated as the retargeting and deprovisioning process proceeds). This facilitates achieving real time interactivity and responsiveness goal(s). After the deprovisioning process is complete, a more complicated process is undertaken for optimizing the image definitions, mapping of the finalized images to computers and images to the software packages, described below.

Additional Processing for Install Everywhere, No Cost and Relevancy.

In addition to counting distinct images, apparatus 10, through the image reducing logic 42, is configured to determine different mappings, as follows: (i) computers->images; (ii) software packages->computers; and (iii) software packages->images. To fully determine the above mappings, a somewhat more complicated set of determinations are needed, in contrast to the SELECT Count (distinct x) statement used to determine a quick count as described above. Initially, additional processing must be done for software packages marked Install Everywhere and No Cost. After that the "relevancy" of automated changes made by the image reducer must be evaluated. Once that is completed, the final mapping may be established.

As described above, additional handling is required for deprovisioned software packages in the Install Everywhere and the No Cost deprovisioning states. Generally, after the Install Everywhere and the No Cost bits have been set in accordance with the procedures described below, the deprovisioning logic 66 can make the needed determination to establish the mappings described above. For example, computers can be joined to images (distinct) and vice versa by joining on their corresponding bitmasks in the association matrix 46a.

Install Everywhere.

Figure 6:
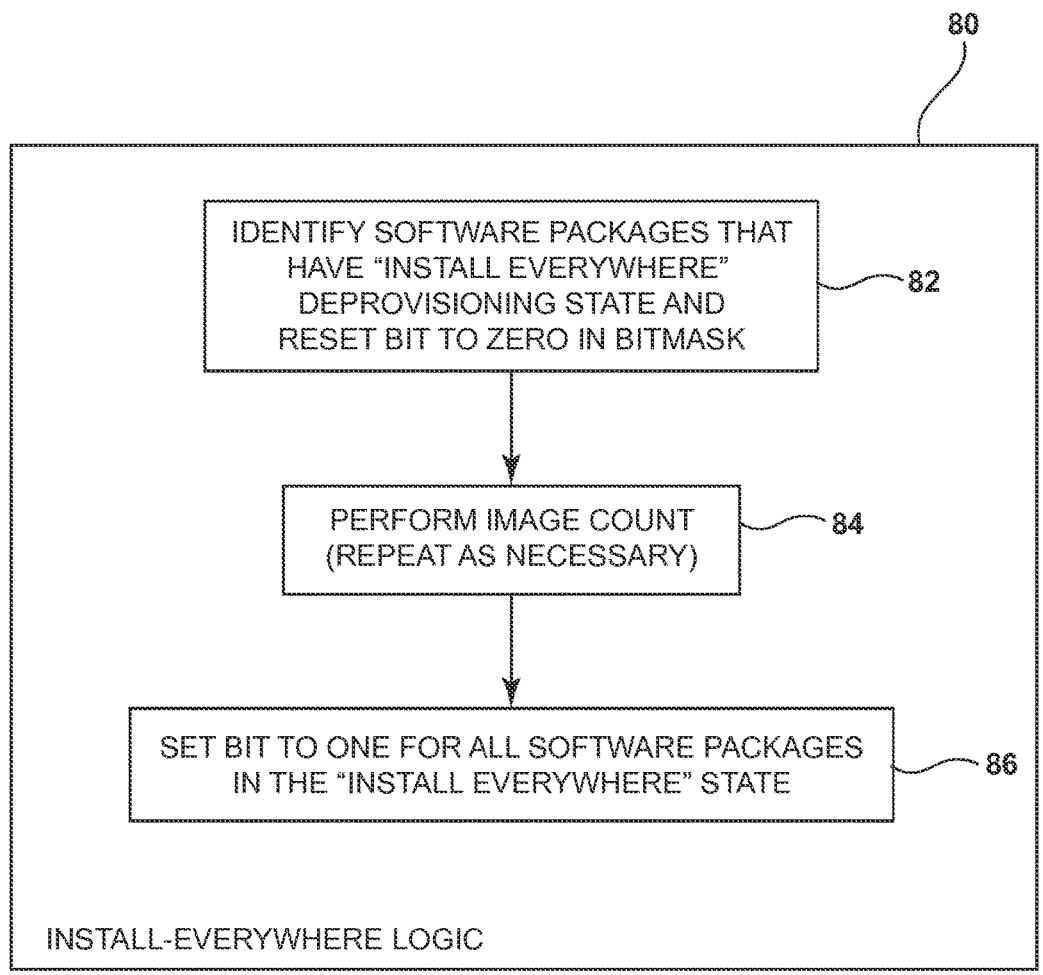
FIG. 6 is a block diagram showing, in greater detail, the deprovisioning logic of FIG. 4 and more particularly install-everywhere logic.

FIG. 6 is simplified flowchart diagram of install-everywhere logic 80. As already described, software packages that are marked as being in the Install Everywhere deprovisioning state are initially set to zeros in each computer's associated machine bitmask 50b, as shown in block 82. For the purposes of counting distinct images, this approach works because of the "Bit on everywhere=Bit off everywhere" concept described above. It is also more efficient to count images in this way. However, once distinct images have been counted (block 84), and the user is satisfied with the reduction in the number of distinct images—and thus further deprovisioning is not made—the install-everywhere logic 80 of the deprovisioning logic 66 performs a second pass on the updated machine bitmasks 50b and the Install Everywhere bits are set to one for all the computers.

No Cost.

Software packages marked No Cost are treated just like software packages marked as Install Everywhere except that No Cost packages are optimized on a per image basis.

Figure 7:
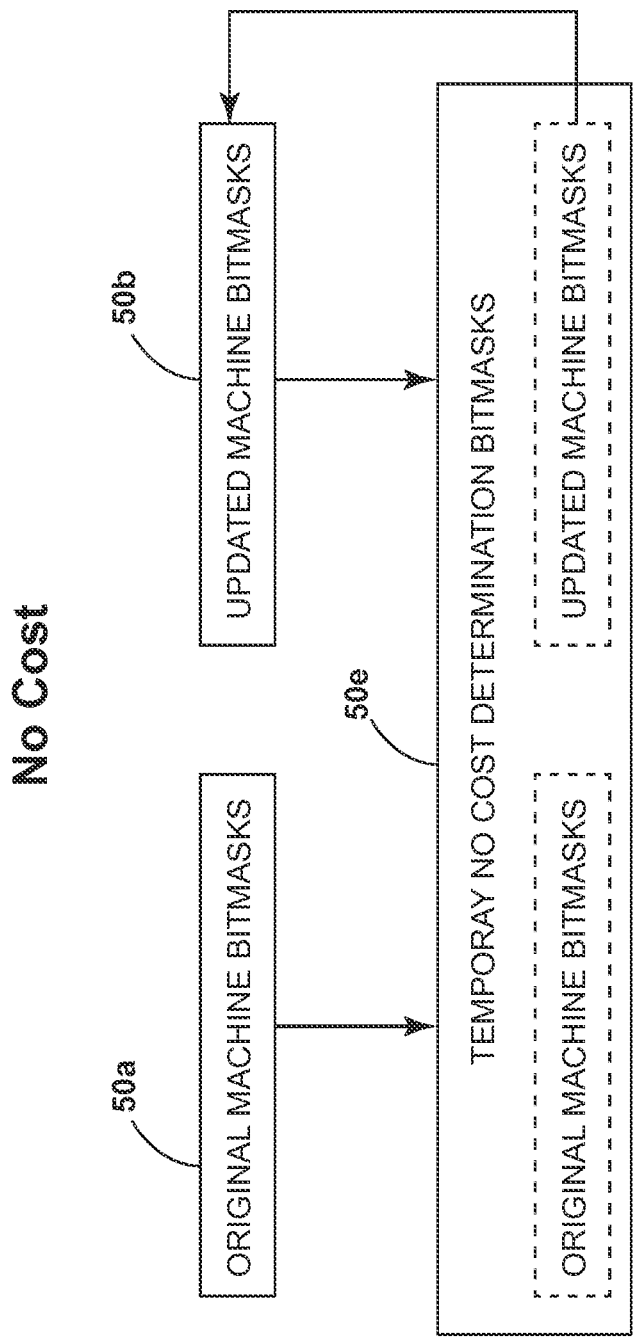
FIG. 7 is a simplified diagram showing, in greater detail, the deprovisioning logic of FIG. 4 and more particularly no-cost logic.

FIG. 7 is a simplified diagram showing the operation of the no-cost logic of apparatus 10 in an embodiment. As with the Install Everywhere deprovisioning state, software packages that are marked as being in the No Cost deprovisioning state are initially set to zeros in each computer's associated machine bitmask 50b. For purposes of counting distinct images, this works because of the "Bit on everywhere=Bit off everywhere" concept described above. It is also more efficient to count images in this way. However, once distinct images have been counted, and the user is satisfied with the reduction in the number of distinct images—and thus further deprovisioning is not made—the no-cost logic (of the deprovisioning logic 66) performs a second pass on the updated machine bitmasks 50b. In particular, the No Cost bits are set on certain computers, but only on those computers which were absorbed into images containing one or more computers that were originally associated with the corresponding software package represented by a particular No Cost bit.

It should be understood that a particular computer does not need to have a given No Cost software package installed to have its No Cost bits set to one as long as other computers sharing the same distinct image meet the criteria of having some No Cost software packages installed. In other words, the restoration process regarding No Cost deprovisioned software packages is ultimately handled just like Install Everywhere except the bits are only turned on in images that contain (are associated with) one or more computers that were originally associated with the corresponding software package represented by a particular No Cost bit.

With continued reference to FIG. 7, the first step in the restoration process for No Cost deprovisioned software packages is to construct a single machine bitmask for each computer in the association matrix 46a (i.e., this can be the original bitmask 50a mentioned above, where a 1 indicates the presence of a software package on a given computer and a 0 indicates the absence of a software package on a given computer). The next step is to zero out the bits in each computer's machine bitmask corresponding to deprovisioned software packages. This will result in what has been described above as the updated machine bitmask 50b.

The next step is to iterate over the rows of the association matrix that contains both the original and the updated machine bitmasks 50e ordered according to the updated bitmask. This will result in identical updated bitmasks being placed in adjacent rows with respect to the iteration sequence. Within each group of identical updated bitmasks, bits are set to 1 in the updated bitmasks matrix 50b if they correspond to bits with one or more non-zero values in the associated original bitmasks in the association matrix 50e.

For example, assume there are four computers of interest and further that a software package "A" has been deprovisioned as No Cost. Further assume that for these four computers, the corresponding bit position in the original machine bitmask for software package "A" is 1-0-1-0, meaning that computer numbers 1 and 3 have the software package "A" but computer numbers two and four do not. During deprovisioning, the bit position for software package "A" is zeroed out, and, as a consequence, the bit position for these four computers in the updated machine bitmask becomes 0-0-0-0. Further assume that these four machine share a distinct image and are thus members of a group. During restoration, the bit position in the "new" updated machine bitmask for these four computers will become to 1-1-1-1. This is because in the original machine bitmask 50a, one or more (in this case 2) non-zero values in the bit position corresponding to No Cost software package "A".

Consider, however, another example, the same as above but where the four computers have, respectively, bits in the original machine bitmask, corresponding to software package "A", of 0-0-0-0 (i.e., none of these computers have software package "A"). In this example, since the bits for software package "A" are zeros in all cases, none of these computers have the bit for No Cost software package "A" set to 1. Finally, in a still further example, the same as above but where the four computers have, respectively, bits in the original machine bitmask, corresponding to software package "A", of 1-1-1-1 (i.e., all of these computers have software package "A"). In this still further example, while deprovisioning will lead to 0-0-0-0, the No Cost logic will revert the bits back to 1-1-1-1.

Figure 8:
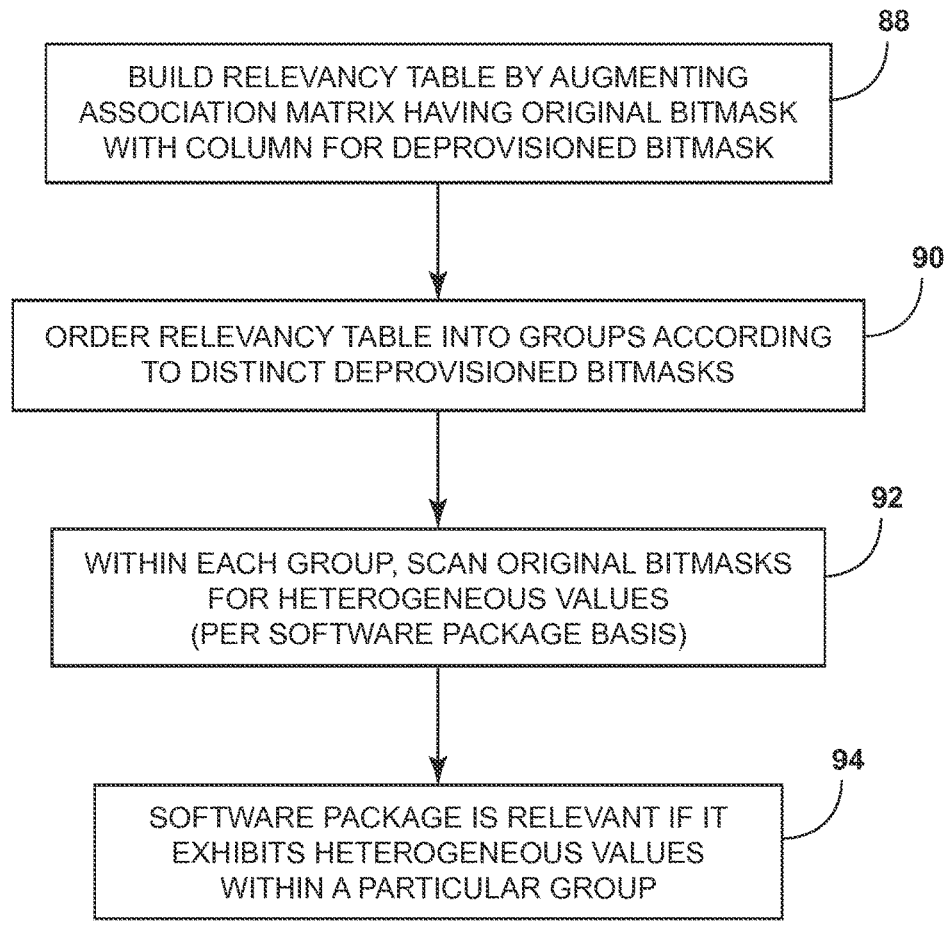
FIG. 8 is a flowchart diagram showing a method for determining the relevancy of a previously-deprovisioned software package.

Identifying Relevant Software Packages. FIG. 8 is a flowchart diagram showing a method performed by relevancy determination logic that is included in the image reducing logic 42. A relevant software package may be a software package that when deprovisioned results in a reduced image count. Thus, in an embodiment, the relevancy determining logic is configured to "un deprovision" (or re-provision) one or more deprovisioned software packages when the respective deprovisioned software package did not have the effect of reducing the number of distinct images in the association matrix.

In an embodiment, the relevancy determination logic may be configured to forego checking the relevancy of manually deprovisioned software packages, but may be configured to check the relevancy of automatically deprovisioned software packages. In this regard, where the image reducer function (see FIG. 5 and accompanying text) deprovisions a software package and then later determines that the software package is not a relevant software package, it will according re-provision that software package.

A deprovisioned software package is relevant if within one or more images some computers originally contained the software package while other machines in the same image did not contain the software package. What this means is that had that particular software package not been deprovisioned, the image it is currently associated with would have been broken out into multiple images and hence the overall image count would have been higher. Since deprovisioning this software package contributed to the lowering of the image count, the software package is relevant and as a result the relevancy determining logic allows this software package to stay deprovisioned. Software packages that do not meet the relevancy criteria are re-provisioned because by definition deprovisioning them did not contribute to a reduction of the overall image count.

With continued reference to FIG. 8, a method of determining relevancy is illustrated. The method begins in step 88.

In step 88, a relevancy matrix is created having one row per computer which includes the original machine bitmask for the machine and a new machine bitmask which is identical except that additional bits are deprovisioned (zeroed out) per the deprovisioning logic, described above. In an embodiment, the relevancy matrix can be produced by augmenting the association matrix 46a—which contains plural records (rows) having computer identifications and the original machine bitmasks—with the updated machine bitmasks reflecting the deprovisioning of the software packages. The method proceeds to step 90.

In step 90, the relevancy matrix is ordered into groups according to distinct, updated machine bitmasks, where each group has associated therewith one or more member computers. The method proceeds to step 92.

In step 92, within each group of identical (new) updated machine bitmasks, check the bits in the corresponding original machine bitmasks. Software packages with bits having heterogeneous values (i.e., both zeros and ones) are relevant, and are marked as relevant. Such software packages are relevant, in that had they not been zeroed out, the member computers that share the same image together would otherwise have been split out into multiple, different images. Hence the bits (bit position(s)) with heterogeneous values contributed to reducing the image count and by definition are considered to be relevant. The method proceeds to step 94.

In step 94, the image reducing logic 42 is further configured to restore any deprovisioned software packages to their original state, provided such deprovisioned software package are not marked as relevant.

Mapping Finalized Distinct Images to Computers and Software Packages.

The image reducing logic 42, is configured to determine different mappings, as follows: (i) computers->images; (ii) software packages->computers; and (iii) software packages->images. The first step is to determine a collection of distinct images. In one embodiment, this can be done by performing a "SELECT Distinct" in SQL Server on the updated bitmasks 50*b* in order to produce a collection of distinct bitmasks 50*d* which is equivalent to distinct images.

In another embodiment, one of a number of well-known algorithms which produce a list of distinct items given a list of non-distinct items may be employed to operate on a list of finalized machine bitmasks 50*c* resulting from previous steps above. The resulting list of distinct bitmasks 50*d* is equivalent to the distinct images.

The mapping of computers to images can be determined by cross referencing the distinct bitmasks 50*d* from the previous step with the non-distinct bitmasks from the steps before that. From this a list of distinct computers cross referenced to bitmasks can be obtained. This is equivalent to the mapping of images to computers.

In an embodiment, a "SELECT Distinct ComputerId, Bitmask" SQL Server command can be used to create this mapping of computers to images.

The mapping of software packages to images can be determined by converting the bits in the bitmask of each distinct image back into package identifiers.

The mapping of software packages to computers can be determined by examining the distinct bitmasks 50*d* and converting the bits in the bitmask corresponding to each computer back into package identifiers.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that the apparatus for computer image analysis and planning as described above, particularly an electronic process as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the disclosed logic blocks and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. In a distributed computing system having a plurality of computers wherein each computer has a respective image associated therewith defined by a pairing of a respective operating system and a respective collection of associated software packages, an apparatus comprising:

an electronic processor and a memory coupled to said processor;

image identification logic stored in said memory which, when executed by the electronic processor, is configured to identify a number of said plurality of images associated with said computers that are distinct; and image reducing logic stored in said memory which, when executed by said processor, is configured to reduce said number of distinct images, wherein an electronic data collection agent in communication with said plurality of computers is configured to collect original data associated with said plurality of computers wherein said original data includes, for each computer, an identification of a respective operating system and a respective collection of associated software packages, said original data comprising a plurality of records for each of said plurality of computers, wherein said image identification logic is further configured to compress original data into a respective, single record for each of said computers; and wherein said image identification logic is further configured to:

construct, for each of said computers, a respective binary word wherein each bit position of said binary word corresponds to the presence or absence of one of said software packages; and build an association matrix by associating, for each of said computers, a respective computer identification with a respective one of said constructed binary words; and wherein said binary word comprises a bitmask and wherein said bitmasks in said association matrix comprise original machine bitmasks, and wherein said image reducing logic further includes means for modifying said original machine bitmasks and replacing said original machine bitmasks in said association matrix with updated machine bitmasks such that a number of distinct updated machine bitmasks in said association matrix is less than said number of distinct original machine bitmasks in said association matrix, wherein said modifying means includes deprovisioning logic, which when executed by said processor, is configured to deprovision one of said software packages in said updated machine bitmasks relative to said original machine bitmasks, indicating the absence of said deprovisioned software package, so as to reduce the number of distinct updated machine bitmasks in said association matrix, and wherein said deprovisioning logic is further configured to:

categorize said deprovisioned software package into one of a plurality of deprovisioning states wherein said deprovisioning states comprise
 (i) a first state wherein said deprovisioned software package is deemed to be installed on all computers,
 (ii) a second state wherein said deprovisioned software package is deemed to be published,
 (iii) a third state wherein said deprovisioned software package is deemed to be virtualized,
 (iv) a fourth state wherein said deprovisioned software package is deemed no cost,
 (v) a fifth state wherein said deprovisioned software package is deemed to be user installed, and
 (vi) a sixth state wherein said deprovisioned software package is deemed not to be provisioned; and wherein said selected state is said fourth state and said deprovisioned software package is reset in said updated machine bitmasks relative to said original machine bitmasks, and wherein said image reducing logic includes no-cost logic that is configured to selectively set said deprovisioned software package in said updated machine bitmasks indicating the presence of said software package; and wherein said no-cost logic is configured to:
 identify distinct images in said association matrix based on said updated machine bitmasks as modified by said deprovisioning logic, wherein each distinct image is associated with one or more member computers; and
 for each distinct image bitmask, set the bit corresponding to software packages in said fourth, no-cost state for all member computers associated with a respective distinct image when such bit in said original machine bitmasks among said member computers of said respective image contains one or more non-zero values.

2. In a distributed computing system having a plurality of computers wherein each computer has a respective image associated therewith defined by a pairing of a respective operating system and a respective collection of associated software packages, an apparatus comprising:

an electronic processor and a memory coupled to said processor;

image identification logic stored in said memory which, when executed by the electronic processor, is configured to identify a number of said plurality of images associated with said computers that are distinct, said image identification logic is further configured to (i) construct, for each of said computers, a respective binary word wherein each bit position of said binary word corresponds to the presence or absence of one of said software packages and (ii) build an association matrix by associating, for each of said computers, a respective computer identification with a respective one of said constructed binary words; and image reducing logic stored in said memory which, when executed by said processor, is configured to reduce said number of distinct images;

wherein said binary word comprises a bitmask and wherein said bitmasks in said association matrix comprise original machine bitmasks, and wherein said image reducing logic further includes means for modifying said original machine bitmasks and replacing said original machine bitmasks in said association matrix with updated machine bitmasks such that a number of distinct updated machine bitmasks in said association matrix is less than said number of distinct original machine bitmasks in said association matrix;

wherein said modifying means includes deprovisioning logic, which when executed by said processor, is configured to deprovision one of said software packages in said updated machine bitmasks relative to said original machine bitmasks, indicating the absence of said deprovisioned software package, so as to reduce the number of distinct updated machine bitmasks in said association matrix, and wherein said image reducing logic includes relevancy logic configured to re-provision one or more deprovisioned software packages by restoring said one or more deprovisioned software packages to its original state in said updated machine bitmasks thereby indicating the presence of such re-provisioned software packages in said updated machine bitmasks when the respective deprovisioned software package did not have the effect of reducing the number of distinct images in the association matrix.

3. The apparatus of claim 2 wherein said relevancy logic is further configured to:

build a relevancy matrix by augmenting said association matrix, which contains records having said computer identifications and said original machine bitmasks, by appending said updated machine bitmasks, which reflects deprovisioning;

order the relevancy matrix into groups according to distinct updated machine bitmasks, wherein each group has associated therewith one or more member computers; and within each group, search for heterogeneous bits on a per software package basis and mark such software packages as relevant.

4. The apparatus of claim 3 wherein said restoring of any deprovisioned software packages to its original state in said updated machine bitmasks occurs provided such deprovisioned software packages were not marked as being relevant.

\* \* \* \* \*